United States Patent
Jha et al.

(10) Patent No.: US 12,536,050 B2
(45) Date of Patent: Jan. 27, 2026

(54) CACHE RESIZING BASED ON PROCESSOR WORKLOAD

(71) Applicant: ADVANCED MICRO DEVICES, INC., Santa Clara, CA (US)

(72) Inventors: Dilip Jha, Hyderabad (IN); William L. Walker, Ft. Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 603 days.

(21) Appl. No.: 17/490,013

(22) Filed: Sep. 30, 2021

(65) Prior Publication Data

US 2023/0094030 A1 Mar. 30, 2023

(51) Int. Cl.
*G06F 9/50* (2006.01)
*G06F 12/0811* (2016.01)

(52) U.S. Cl.
CPC ............ *G06F 9/505* (2013.01); *G06F 9/5016* (2013.01); *G06F 9/5038* (2013.01); *G06F 9/5094* (2013.01); *G06F 12/0811* (2013.01)

(58) Field of Classification Search
None
See application file for complete search history.

(56) References Cited

U.S. PATENT DOCUMENTS

| | | | |
|---|---|---|---|
| 6,347,369 B1 * | 2/2002 | Witt | G06F 12/0862 |
| | | | 712/240 |
| 7,457,920 B1 * | 11/2008 | Kornegay | G06F 12/127 |
| | | | 711/134 |
| 7,694,075 B1 * | 4/2010 | Feekes, Jr. | G06F 12/0897 |
| | | | 711/119 |
| 8,412,971 B2 | 4/2013 | Branover et al. | |
| 9,298,616 B2 | 3/2016 | Soundararajan et al. | |
| 9,734,066 B1 * | 8/2017 | Indupuru | G06F 12/128 |
| 10,599,210 B2 * | 3/2020 | Park | G06F 12/0811 |
| 2004/0205296 A1 * | 10/2004 | Bearden | G06F 12/0866 |
| | | | 711/E12.019 |
| 2005/0131995 A1 * | 6/2005 | Chase | G06F 16/9574 |
| | | | 711/E12.019 |
| 2006/0156048 A1 * | 7/2006 | Hines | G06F 1/3203 |
| | | | 713/320 |
| 2006/0179240 A1 * | 8/2006 | Chatterjee | G06F 12/0888 |
| | | | 711/138 |
| 2007/0083712 A1 | 4/2007 | Bradford et al. | |
| 2007/0204106 A1 * | 8/2007 | Donald | G06F 12/0862 |
| | | | 711/E12.057 |
| 2008/0059707 A1 * | 3/2008 | Makineni | G06F 12/0897 |
| | | | 711/122 |

(Continued)

OTHER PUBLICATIONS

International Search Report and Written Opinion mailed Jan. 20, 2023 for PCT/US2022/044842, 9 pages.

(Continued)

*Primary Examiner* — Adam Lee

(57) ABSTRACT

A processor sets the size of a processor cache based on an identified workload executing at the processor. The cache size is set in response to the processor exiting a low-power mode. By setting the size of the cache based on the workload, the processor is able to tailor the size of the cache to the characteristics of a particular workload while also reducing, for at least some workloads, the overhead associated with entering or exiting the low-power mode.

20 Claims, 5 Drawing Sheets

(56) References Cited

U.S. PATENT DOCUMENTS

| | | | |
|---|---|---|---|
| 2009/0006876 A1* | 1/2009 | Fukatani | G06F 3/0625 713/320 |
| 2009/0031088 A1* | 1/2009 | Donley | G06F 12/0862 711/147 |
| 2009/0228693 A1* | 9/2009 | Koenck | G06F 9/26 712/248 |
| 2010/0185821 A1* | 7/2010 | Paver | G06F 12/0831 711/146 |
| 2010/0332761 A1* | 12/2010 | Li | G06F 12/0893 711/135 |
| 2011/0010520 A1* | 1/2011 | Wang | G06F 12/0802 711/170 |
| 2011/0093654 A1* | 4/2011 | Roberts | G06F 1/3203 711/E12.001 |
| 2011/0153770 A1* | 6/2011 | Antani | G06F 16/24539 709/224 |
| 2011/0283124 A1* | 11/2011 | Branover | G06F 1/3275 713/323 |
| 2012/0054442 A1* | 3/2012 | Walker | G06F 12/0802 711/E12.001 |
| 2012/0151225 A1* | 6/2012 | Huang | G06F 3/02 713/300 |
| 2012/0173907 A1* | 7/2012 | Moses | G06F 12/0804 713/321 |
| 2012/0198159 A1* | 8/2012 | Fujikawa | G06F 11/3409 711/E12.017 |
| 2013/0086324 A1* | 4/2013 | Soundararajan | G06F 12/0813 711/E12.024 |
| 2013/0091330 A1* | 4/2013 | Mital | H04L 49/9089 711/130 |
| 2013/0111121 A1* | 5/2013 | Ananthakrishnan | G06F 12/0864 711/128 |
| 2014/0173207 A1* | 6/2014 | Wang | G06F 12/0802 711/122 |
| 2014/0181410 A1* | 6/2014 | Kalamatianos | G06F 12/121 711/133 |
| 2014/0181413 A1* | 6/2014 | Manne | G06F 12/0891 711/135 |
| 2014/0189411 A1* | 7/2014 | Kanchana | G06F 1/3275 713/324 |
| 2014/0310462 A1* | 10/2014 | Waldspurger | G06F 11/3476 711/118 |
| 2014/0340114 A1* | 11/2014 | Priore | H03K 19/003 326/16 |
| 2015/0026406 A1* | 1/2015 | McLellan | G06F 1/3275 711/128 |
| 2015/0026407 A1* | 1/2015 | McLellan | G06F 1/3275 711/128 |
| 2015/0046653 A1* | 2/2015 | Soundararajan | G06F 12/0811 711/146 |
| 2015/0127905 A1* | 5/2015 | Chang | G06F 11/3461 711/118 |
| 2015/0212947 A1* | 7/2015 | Henry | G06F 12/0864 711/119 |
| 2015/0339231 A1* | 11/2015 | Henry | G06F 9/4418 711/119 |
| 2016/0041945 A1* | 2/2016 | Mishaeli | G06F 9/30145 712/32 |
| 2016/0092363 A1* | 3/2016 | Wang | G06F 1/3206 711/119 |
| 2016/0117241 A1* | 4/2016 | Shah | G06F 12/0895 711/119 |
| 2016/0132430 A1* | 5/2016 | Nomura | G11C 11/1697 711/119 |
| 2016/0147631 A1* | 5/2016 | Magdon-Ismail | H04L 67/568 718/100 |
| 2016/0203083 A1 | 7/2016 | Park et al. | |
| 2016/0342518 A1* | 11/2016 | Park | G06F 12/0811 |
| 2017/0060769 A1* | 3/2017 | Wires | G06F 12/1018 |
| 2017/0168757 A1* | 6/2017 | Nakajima | G06F 3/0659 |
| 2017/0185409 A1* | 6/2017 | de Paula Rosa Piga | G06F 11/3409 |
| 2017/0199558 A1* | 7/2017 | Farazmand | G06F 1/3296 |
| 2018/0060238 A1* | 3/2018 | Esser | G06F 12/0848 |
| 2018/0067856 A1* | 3/2018 | Walker | G06F 12/128 |
| 2018/0129612 A1* | 5/2018 | Lewis | G06F 12/121 |
| 2018/0189186 A1* | 7/2018 | Chhabra | G06F 12/123 |
| 2018/0349280 A1* | 12/2018 | Prasad | G06F 12/128 |
| 2019/0004591 A1* | 1/2019 | Park | G06F 11/3062 |
| 2019/0087345 A1* | 3/2019 | Hijaz | G06F 12/0897 |
| 2019/0102272 A1* | 4/2019 | Ramrakhyani | G06F 9/5033 |
| 2020/0050541 A1* | 2/2020 | Johannes de Jong | G06F 12/126 |
| 2021/0208932 A1* | 7/2021 | Park | G06F 9/5027 |
| 2021/0374064 A1* | 12/2021 | Tian | G06F 12/0888 |
| 2022/0131392 A1* | 4/2022 | Isa | H02J 7/0031 |
| 2022/0197798 A1* | 6/2022 | Mandal | G06F 12/0811 |

OTHER PUBLICATIONS

International Preliminary Report on Patentability mailed Apr. 11, 2024 for PCT/US2022/044842, 6 pages.

Extended European Search Report mailed Jul. 8, 2025 for Application No. 22877201.8, 13 pages.

* cited by examiner

CACHE RESIZING BASED ON PROCESSOR WORKLOAD

BACKGROUND

To reduce overall power consumption while maintaining performance, some processing systems employ multiple power modes, wherein each power mode applies a different level of power to various system components, and thereby sets each of the various components to a corresponding level of performance. For example, some processing systems conserve power by placing one or more processor cores and associated caches of the system into low-power modes during expected periods of low processing activity or in response to other system conditions. However, in many cases there is a relatively high amount of overhead associated with transitioning the processor cores and associated circuitry to the low-power state. For example, in many cases the transition to the low power state requires flushing data from one or more caches to a system memory. Further, transitioning out of the low-power mode requires initializing the cache. The power consumption necessitated by the transition overhead reduces the overall power savings from the low-power mode.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
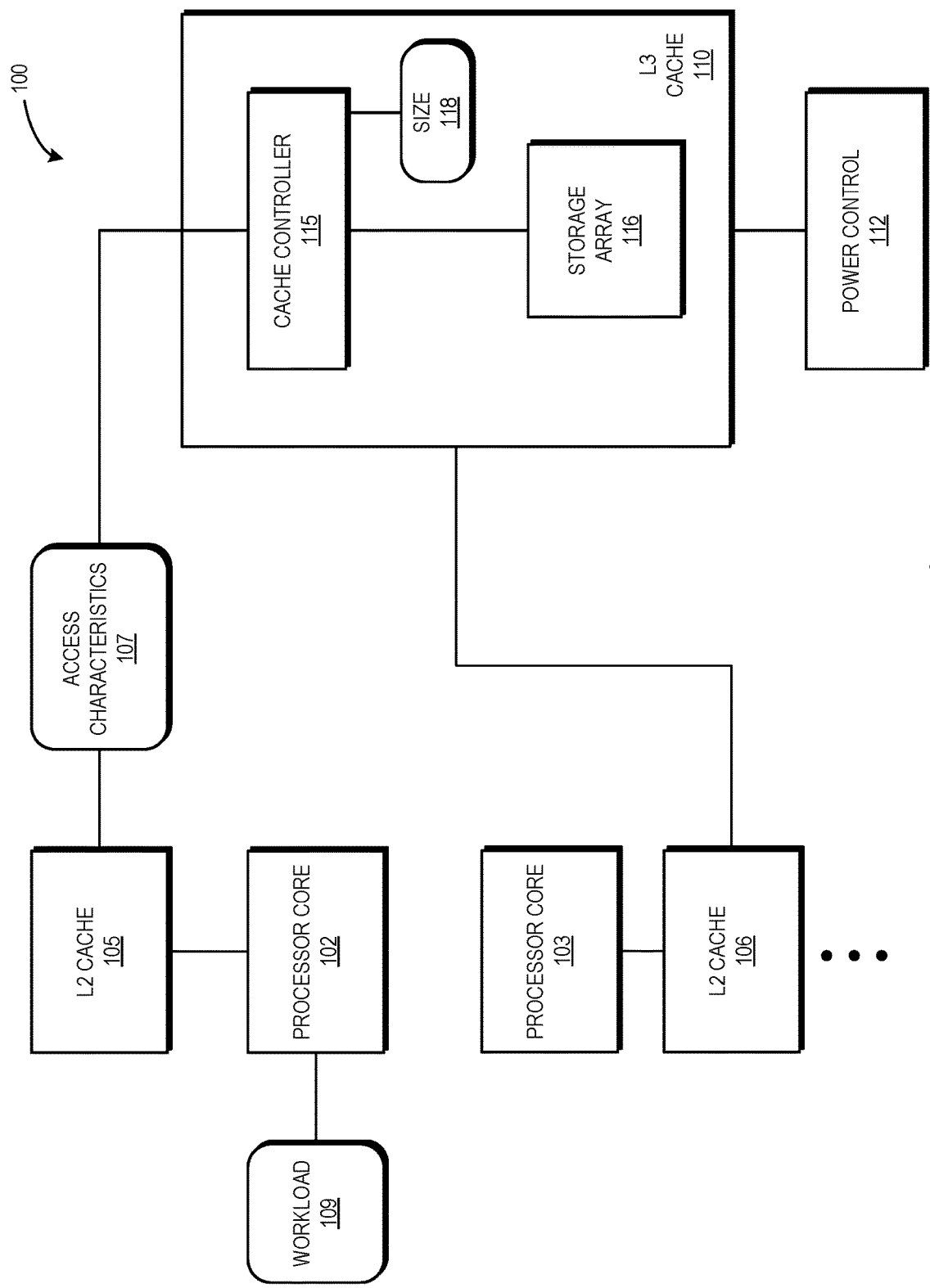
FIG. 1 is a block diagram of a processor configured to set a size of a cache based on an identified workload in accordance with some embodiments.

FIGS. 1-5 illustrate techniques for setting a size of a processor cache based on an identified workload executing at the processor, wherein the cache size is set in response to the processor exiting a low-power mode. By setting the size of the cache based on the workload, the processor is able to tailor the size of the cache to the characteristics of a particular workload while also reducing, for at least some workloads, the overhead associated with entering or exiting the low-power mode. The processor is thus able to reduce overall power consumption while maintaining performance when executing different types of workloads.

To illustrate, in some embodiments, when a processor is transitioning to a low-power mode there is overhead associated with preparing the processor caches, and this overhead is dependent, at least in part, on the size of the processor caches. For example, in some cases when the processor is transitioning to the low-power mode, modified cache lines of a given cache (e.g., a Level 3 ("L3") cache) are identified and then copied (i.e. flushed) to system memory. Identifying and flushing these modified cache lines consumes power, and the amount of power consumed is dependent upon the number of cache lines that must be reviewed. Furthermore, when transitioning out of the low-power mode, each cache line undergoes an initialization process. Moreover, in some cases, unused cache lines are available to be power gated, so that the unused cache lines consume relatively little power. Thus, for at least these reasons, the amount of power consumed is dependent on the size of the cache and by reducing the size of the cache, the overhead associated with transitioning to the low-power mode is reduced.

Furthermore, the amount of the cache used varies based on the workload executed by the processor. Thus, for some workloads, the processor can employ a relatively small cache without imposing a performance penalty on the workload execution. Using the techniques described herein, a processor is able to identify the workloads that will not suffer a performance penalty (or will suffer only a relatively small penalty) from a reduced-size cache. For such workloads, the processor sets the size of the cache to a smaller size, thereby reducing the overhead associated with transitioning to the low-power mode while maintaining performance.

In different embodiments, the processor identifies the workload in different ways, such as by examining the access characteristics of a lower-level cache. For example, in some embodiments the processor identifies the workload by monitoring a number of cache victims (that is, a number of evicted cache lines) at a lower-level cache. A higher number of cache victims indicates a larger cache size is likely to improve performance, while a lower number indicates that a smaller cache size is unlikely to impact execution of the workload. In other embodiments, the processor identifies the workload based on a cache victim rate (that is, a number of cache lines evicted in a specified amount of time) at the lower-level cache. In still other embodiments, the processor identifies the workload based on a number of processor cores that are in an active mode to execute the workload. In yet other embodiments, the processor identifies the workload based on a combination of factors, such as a combination of one or more of the number of cache victims, the cache victim rate, and the number of active processor cores.

In some cases, changing the size of the cache demands a certain amount of overhead, such as changing data structures at a cache controller that indicate the size of the cache, such as the number of cache ways or the number of cache sets, or a combination thereof. To reduce the impact of this overhead, in some embodiments the processor changes the size of the cache only at specified points in time, such as when the processor is exiting the low-power mode. Further, in some embodiments, the processor employs a bimodal counter or other structure to provide hysteresis for the size of the cache. For example, in some embodiments, the processor adjusts a bimodal counter each time the processor detects a particular workload at the processor, and resets the bimodal counter in response to exiting a low-power mode. The processor only adjusts the size of the cache in response to the bimodal counter exceeding a specified threshold. The processor thereby prevents relatively transient changes in the processor workload from triggering frequent changes in the size of the cache.

FIG. 1 illustrates a block diagram of a processing system 100 in accordance with some embodiments. The processing system 100 is generally configured to execute sets of instructions (e.g., programs) or commands (e.g., draw commands) to carry out tasks on behalf of an electronic device. Accordingly, in different embodiments the processing system 100 is incorporated into one of a variety of electronic devices, such as a desktop computer, laptop computer, server, smartphone, tablet, game console, and the like. To support execution of instructions, the processing system 100 includes a GPU 102 and a PIM device 104. In some embodiments, the processing system 100 includes additional processing units (e.g., one or more central processing units (CPUs)), memory devices, or other supporting devices (e.g., one or more input/output (I/O) controllers), and the like, or any combination thereof.

The GPU 102 is a processing unit generally configured to perform specified operations in response to received commands, such as commands received from a CPU. Examples of the types of operations performed by the GPU 102 includes graphics operations (e.g., execution of draw commands and other graphics commands), vector operations, matrix operations, operations associated with machine learning, neural networks, artificial intelligence, and the like, or any combination thereof. In other embodiments, the GPU 102 is a different type of processing unit or processor, such as a parallel processor, a single instruction multiple data (SIMD) architecture processor, a single instruction multiple thread (SIMT) architecture processor, or another processor for performing tasks such as graphics, machine intelligence or compute operation tasks.

To execute the sets of instructions or commands, the processor 100 includes a plurality of processor cores, including a processor core 102 and a processor core 103. Each of the processor cores 102 and 103 includes one or more instruction pipelines, with each instruction pipeline including a plurality of stages, wherein the plurality of stages is collectively arranged and configured to execute instructions in a pipelined fashion. In some embodiments, the processor 100 is a multithreaded processor, wherein each program executed by the processor 100 includes one or more threads, and the one or more threads are assigned to the different processor cores, and to the different corresponding pipelines, for execution. The pattern of instructions or commands executed by a processor core over a given amount of time, and the corresponding pattern of operations generated by the processor core, is referred to as the workload (e.g., the workload 109) of the processor core.

In the course of executing a workload, the processor cores 102 and 103 interact with a memory hierarchy of the processor 100 to store and retrieve data. The memory hierarchy includes different levels of caches (e.g. caches 105, 106, and 110) and a system memory (not shown) at the top of the memory hierarchy. To improve memory access speed and efficiency, the processor 100 is generally configured to manage the memory hierarchy according to a specified memory management scheme. For example, in some embodiments, the processor 100 is configured to move recently accessed data, as well as data that is expected to be accessed soon, down the memory hierarchy so that the data is closer to, and more readily accessible by, one or more of the processor cores 102 and 103. To make room for incoming data at a given level of the memory hierarchy, the processor 100 is generally configured to move, or evict, less recently used data to higher levels of the memory hierarchy.

In the depicted embodiment, the memory hierarchy includes Level 2 (L2) caches 105 and 106 and an L3 cache 110. The L2 caches 105 and 106 are dedicated to the processor cores 102 and 103, respectively, while the L3 cache 110 is shared among the processor cores 102 and 103.

In some embodiments, the memory hierarchy includes additional caches, including Level 1 (L1) caches dedicated to each of the processor cores 102 and 103. To access the memory hierarchy, the processor cores 102 and 103 generate memory access operations, including read operations to read data from the memory hierarchy and write operations to write data to the memory hierarchy. In response to each memory access operation, the processor 100, via one or more memory or cache controllers, determines if the cache line targeted by the memory access is stored at the lowest level of the memory hierarchy (e.g., the corresponding L1 cache). If so, the processor 100 executes the memory operation at the lowest memory hierarchy level. If the cache line is not stored at the lowest memory hierarchy level, the processor 100 traverses the memory hierarchy until the cache line is located, and then proceeds to execute the memory access operation. In addition, based on the memory management scheme, the processor 100 transfers the cache line to one or more levels of the memory hierarchy. For example, in some embodiments, the processor 100 transfers the cache line to one or more of the L2 caches 105 and 106, or to the L3 cache 110.

In some cases, when a cache line is transferred into a cache, a selected cache line must be evicted from the cache to make room for the incoming cache line. The evicted cache line is transferred to a higher level in the memory hierarchy. For example, when a cache line is evicted from either of the L2 caches 105 and 106, the cache line is transferred to the L3 cache 110. Cache lines evicted from one of the L2 caches 105 and 106 are referred to herein as "victim cache lines."

To facilitate storage of cache lines, the L3 cache 110 includes a cache controller 115 and a storage array 116. The cache controller 110 is generally configured to control operations to be performed at the L3 cache 110, including processing of memory access requests and associated operations such as data coherency operations, security operations, and the like. The storage array 116 is a set of memory cells (e.g., bit cells) organized and collectively configured to store and retrieve cache lines based on control signaling from the cache controller 115.

In some embodiments, the cache controller 115 is configured to handle overhead at the L3 cache 110 associated with the processor 100 entering a low-power mode. To illustrate, the processor 100 includes a power control module 112 that is configured to set a power mode of the processor 100 based on one or more specified conditions. For example, in some embodiments the power control module 112 measures performance characteristics of one or more of the processor cores 102 and 103, the L2 caches 105 and 106, and the L3 cache 110 to determine an expected activity level of the processor 100, and sets the power mode for the processor 100 based on the expected activity level.

Based on the specified conditions, the power control module 112 sets the power mode of the processor 100 to one of two power modes: an active mode and a low-power mode. In the active mode, the processor cores 102 and 103 are supplied with enough power to execute instructions and the caches 105, 106, and 110 are each supplied with enough power to maintain data stored at their respective storage arrays. In the low-power mode, the processor cores 102 and 103 are supplied with less power, so that the cores are unable to execute instructions. Furthermore, in the low-power mode the caches 105, 106, and 110 are not supplied with enough power to maintain data stored at the corresponding storage arrays.

In order to ensure the data stored at the storage array 116 is preserved while the processor 100 is in the low-power mode, the cache controller 115 is configured to flush data to system memory (not shown). In particular, in response to an indication from the power control module 112 that the processor 100 is to enter the low-power mode, the cache controller 115 identifies which entries of the L3 cache 110 (that is, which cache lines stored at the storage array 116) have been modified since the last time those cache lines were stored to system memory. The cache controller 115 then issues a set of write operations to write the modified cache lines to the system memory. When the processor 100 exits the low-power mode, the cache controller 115 initializes each entry that is available to be used, such as by writing pre-defined initial data to each entry, setting coherency state information for each entry, and the like.

In addition to controlling storage and retrieval of cache lines and performing flush operations, the cache controller 115 is configured to set a size of the cache 110 by setting the amount of storage array 116 that is used during execution of workloads by the processor cores 102 and 103. For example, in some embodiments the cache controller 115 organizes the L3 cache as a set-associative cache, with the storage array divided into a designated number of sets, and with each set having a designated number of cache ways. When a cache line is to be transferred to the L3 cache 110, the cache controller 115 identifies a set corresponding to the memory address for the cache line, and selects a way to store the cache line based on a specified way selection policy. The cache controller 115 maintains a set of one or more data structures, designated size 118, to identify the number of sets and ways of the L3 cache 110, as well as the memory addresses assigned to the different sets. Accordingly, by changing these data structures, the cache controller 115 changes a size of the L3 cache 110.

To illustrate via an example, in some embodiments the storage array 116 is able to store a maximum number of P cachelines. For these P cachelines at maximum size, the cache controller 115 organizes the L3 cache 110 into N sets, with each set having M ways and sets the size 118 accordingly. To reduce the size of the cache by half, the cache controller 115 changes the size 118 so that the L3 cache 110 is organized into N sets, with each set having M/2 ways. Thus, by reducing the size 118 by half, only half of the maximum number of ways are available to be used by the L3 cache 110. In other embodiments, the cache controller 115 changes the size 118 so that the L3 cache 110 is organized into N/2 sets, with each set having M ways. In still other embodiments, the cache controller 115 changes the size 118 to change both the number of sets and the number of ways. Thus, in different embodiments, the cache controller 115 changes the size 118 by changing the number of ways, the number of sets, or any combination thereof.

As explained above, during a flush operation the cache controller 115 identifies the modified cache lines at the storage array 116 and transfers the identified cache lines to system memory. This overhead associated with the flush operation consumes power and other resources, with the amount of resources consumed dependent at least in part on the size of the L3 cache 110. For example, the smaller the size of the L3 cache 110, the fewer number of cache entries that need to be reviewed by the cache controller 115, during the flush operation, to determine which entries have been modified. In addition, when the processor 100 transitions out of the low-power mode, the cache controller 115 initializes each available cache line. Thus, the smaller the size of the L3 cache 110, the fewer number of cache entries that need to be initialized by the cache controller 115. Moreover, in some embodiments the cache controller 115 power gates entries at the storage array 116 that are not available to be used, so that the storage array 116 consumes less power overall in the active mode.

Further, some workloads executing at the processor cores 102 and 103 cause relatively few memory accesses, and therefore use less than all of the available storage at the storage array 116. Accordingly, to reduce overhead (and therefore reduce the corresponding consumption of resources) and power consumption, the cache controller 115 sets the size 118 by identifying the workload 109 executing at one or more of the processor cores 102 and 103 and sets the size 118 of the L3 cache 110 based on the identified workload. The cache controller 115 is thus able to tailor the size of the cache 110 to the amount of the storage array 116 that is expected to be used by the workload 109, and is therefore able to reduce overhead, such as the overhead associated with flush operations and initialization operations, as well as reduce power consumption by the storage array 116, when such a reduction in overhead and power consumption is not expected to impose a performance penalty on execution of the workload 109.

For example, if the identified workload 109 is determined by the cache controller 115 to be a workload that is expected to use a relatively small portion of the storage array 116, the cache controller 115 sets the size 118 to a relatively smaller size, thereby reducing the overhead associated with any flush operations. If, in contrast, the cache controller 115 identifies the workload 109 as a workload that is expected to use a larger portion of the storage array 116, the cache controller 115 sets the size 118 to a relatively larger size, ensuring that execution of the workload 109 does not suffer a performance penalty.

In different embodiments, the cache controller 115 identifies the workload 109 in any of a number of different ways. For example, in some embodiments the cache controller 115 monitors access characteristics 107 at one or more of the L2 caches 105, wherein the access characteristics indicate patterns of access and activity at the monitored caches. For purposes of description, it is assumed that the access characteristics 107 reflect access characteristics of the L2 cache 105 only. In other embodiments, the access characteristics represent combined access characteristics for more than one L2 cache, such as both the L2 cache 105 and the L2 cache 106. Based on the access characteristics 107, the cache controller 115 sets the size 118 of the L3 cache 110. For example, in some embodiments the cache controller 115 compares the access characteristics 107 to one or more thresholds and based on the results of the comparisons, sets the size 118.

In some embodiments, the access characteristics 107 include the number of cache victims at the L2 cache 105. For example, in some embodiments the cache controller 115 includes a counter that is incremented each time a cache line is evicted from the L2 cache 105, wherein the counter is reset responsive to specified conditions, such as a reset of the processor 100 or initiation of the execution of a new thread at the processor 102. The counter thus reflects, for the workload 109, the number of cache victims (that is, the number of evicted cache lines) at the L2 cache 105 since the last reset of the counter. The cache controller 115 compares the number of cache victims to one or more thresholds and, based on the comparisons sets the size 118.

In other embodiments, in addition to or instead of the number of cache victims, the access characteristics 107 include the cache victim rate at the L2 cache 105. In other words, the access characteristics 107 indicate the rate at which the L2 cache 105 is generating cache victims. For example, in some embodiments the cache controller 115 includes a counter that is incremented each time a cache line is evicted from the L2 cache 105, wherein the counter is periodically reset responsive to expiration of a repeating timer. The counter thus reflects, for the workload 109, the cache victim rate (that is, the number of evicted cache lines per amount of time reflected by the timer) at the L2 cache 105. The cache controller 115 compares the cache victim rate to one or more thresholds and, based on the comparisons sets the size 118.

In still other embodiments, in addition to or instead of identifying the workload 109 based on the access characteristics 107, the cache controller 115 identifies the workload 109 based on other indicators of activity at the processor 100, such as the number of active processor cores (e.g., the number of processor cores in an active power mode). For example, in some embodiments the cache controller 115 compares the number of active processor cores to a threshold and, based on the comparison, sets the size 118 of the L3 cache 110.

In some cases, changing the size 118 of the L3 cache 110 demands management operations from the cache controller 115, such as organizing the data stored at the storage array 116 based on the new cache size. Accordingly, to reduce the impact of the overhead associated with these management operations, in some embodiments the cache controller 115 changes the size of the L3 cache 110 only at specified points or under specified conditions when the impact of the overhead is expected to be small. For example, in some embodiments the cache controller 115 changes the size 118 only in response to exiting the low-power mode, when the cache controller 115 is already organizing the L3 cache 110.

To further illustrate, in response to receiving an indication from the power control module 112 that the processor 100 is to enter the low-power mode, the cache controller 115 determines the size 118 based on the workload 109, such as by identifying the access characteristics 107 and comparing the identified characteristics to one or more thresholds. In response to the power control module 112 returning the processor 100 to the active state, the cache controller 115 sets the size of the cache to the size 118.

In some embodiments, the cache controller 115 sets the size 118 by selecting a size from a set of pre-defined sizes. For example, in some embodiments the cache controller stores a set of pre-defined sizes including a bypass size, a half-size, and a full size, and selects from among this set of pre-defined sizes when setting the size 118. When the bypass size has been selected, the L3 cache 110 is bypassed, and data that would otherwise be stored at the L3 cache 110 is instead transferred to system memory.

In some embodiments, the L3 cache 110 is incorporated into a stacked die integrated circuit, wherein different portions of the storage array 116 are located on different individual dies. This allows the cache controller 115 to, when setting the size of the storage array 116, set the size so that portions of the storage array 116 located on particular dies to be unused. This in turn allows the power control module 112 to power gate the corresponding dies, thereby conserving power consumption at the processor 100.

Thus, to illustrate via an example, in some embodiments the cache controller 115 is configured to set the size 118 to one of three pre-defined sizes: a bypass size, wherein the L3 cache 110 is bypassed; a half size, wherein only half of the entries at the storage array 116 are available to be used, and a full size, wherein all of the entries at the storage array 116 at a specified die are to be used, but portions of the storage array 116 on other dies are unused. For the bypass size configuration, power is saved by keeping the storage array 116 power gated (e.g., at zero operating voltage), by avoiding cache initialization, and by avoiding the overhead associated with a cache flush. For the half-size configuration, power is saved by initializing only half of the storage array 116, by reducing overhead during the active mode (e.g., reducing comparison to half ways or half index), by avoiding flush operations for half the storage array 116, and by power gating the half of the storage array 116 that is not used, including if such portions are located on another die in a stacked die arrangement. In the full size mode, if die stacking is present power is saved by keeping any disabled die stacked cache power gated (if die stacking present), by avoiding die stacked cache initialization, and by avoiding die stacked cache flush.

It will be appreciated that although the embodiment of FIG. 1 and other embodiments described herein have been discussed with respect to setting the size of an L3 cache, in other embodiments similar techniques are employed to set the size of a cache at a different level of a memory hierarchy. For example, in some embodiments the size of an L2 cache is set based on access characteristics (e.g., a number of cache victims) associated with an L1 cache.

Figure 2:
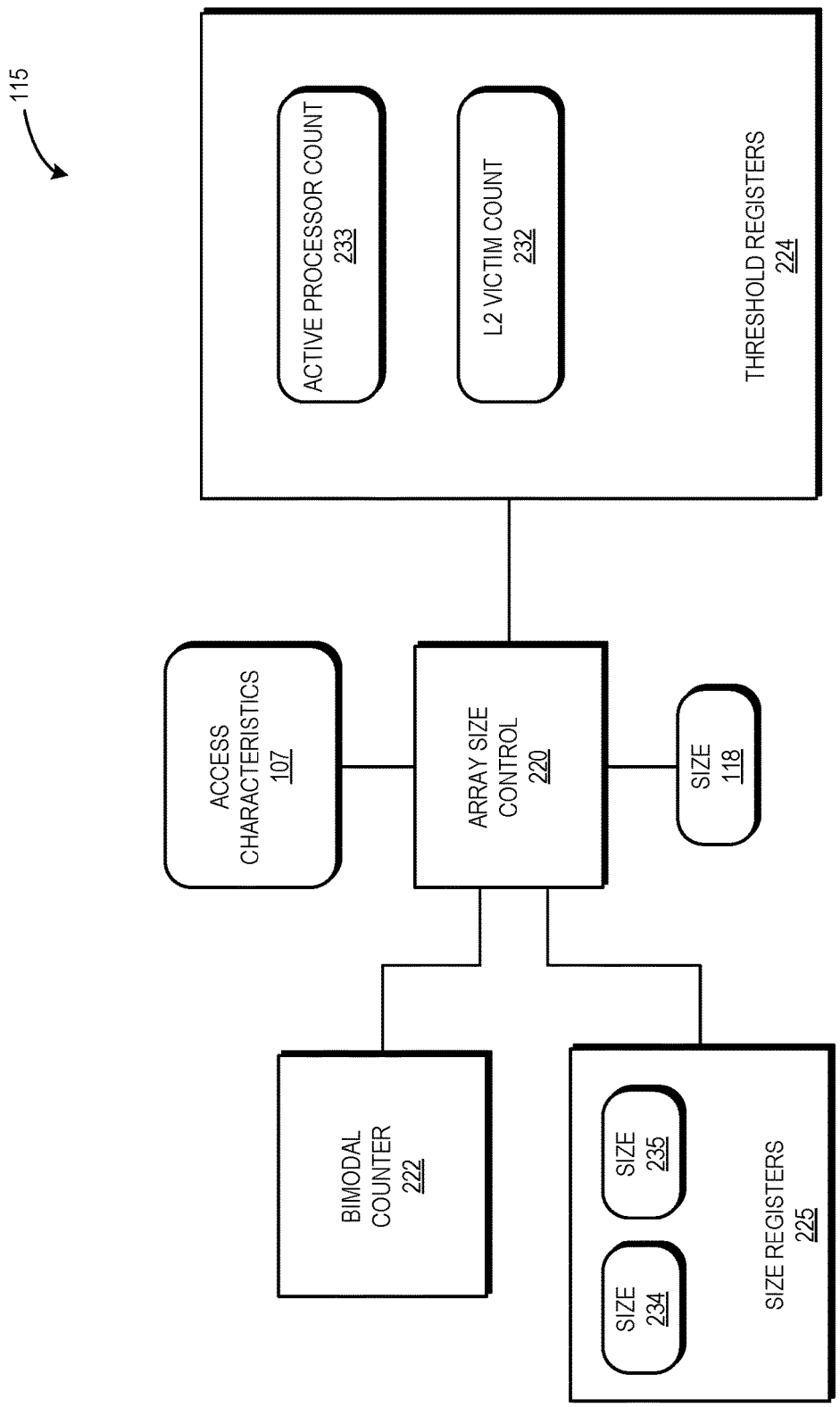
FIG. 2 is a block diagram of a cache controller of the processor of FIG. 1 configured to set the size of the cache based on the identified workload in accordance with some embodiments.

FIG. 2 illustrates an example of the cache controller 115 in accordance with some embodiments. In the depicted example, the cache controller 115 includes an array size control module 220, a bimodal counter 222, threshold registers 224, and size registers 225. The array size control module 220 is a set of circuits, such as a set of circuits implementing a state machine or other decision logic, that together set the size 118 of the L3 cache 110 based on the access characteristics 107, and using information stored at the bimodal counter 222, the threshold registers 224, and the size registers 225.

The size registers 225 are a set of registers configured to store pre-defined size settings (e.g., size 234 and size 235) for the size 118. In some embodiments, the size registers 225 are programmable registers, so that the size settings are changeable by, for example, a program executing at the processor 100. The threshold registers 224 are a set of registers configured to store workload thresholds that correspond to different size settings as stored at the size registers 225. For example, in the depicted embodiment, the threshold registers 224 store an active processor count threshold 233 and an L2 victim count threshold 232. In other embodiments, the threshold registers 224 store additional thresholds associated with other access characteristics, such as one or more L2 victim rate thresholds. Further, in some embodiments the threshold registers 224 store more than one threshold for a given access characteristic to provide more granularity in selection of the size 118. For example, in some embodiments the threshold registers 224 store multiple L2 victim count thresholds, with each L2 victim count threshold corresponding to a different one of the size registers 225. Moreover, in some embodiments the threshold registers 224 are programmable, allowing different programs executing at the processor 100 to set different threshold values.

The bimodal counter 222 is a counter used by the array size control module 220 to provide hysteresis for the size 118, as described further below. In some embodiments, the bimodal counter 222 is a two-bit saturating counter.

In operation, in response to the power control module 112 indicating that the processor 100 is to enter the low-power mode, the array size control module 220 compares the number of cache victims at the L2 cache 105 (as indicated by the access characteristics 107) to the L2 victim count threshold 232. If the number of cache victims is below the threshold 232, indicating a relatively low amount of activity at the L3 cache 110, the array size control module 220 increments the bi-modal counter 222. If the number of cache victims meets exceeds the threshold 232, indicating a relatively high amount of activity at the L3 cache 110, the array size control module 220 decrements the bi-modal counter 222.

In response to the power control module 112 indicating that the processor 100 is exiting the low power mode, the array size control module 220 first determines the number of processor cores that are to be placed in the active mode (referred to as the number of active processor cores), as indicated by the power control module 112. If the number of active processor cores matches or exceeds the active processor count threshold 233, the array size control module 220 selects the larger of the size 234 and size 235 and sets the size 118 to the selected size.

If the number of active processor cores is less than the active processor count threshold 233, the array size control module 220 compares the value at the bimodal counter 222 (referred to as the bimodal count) to a threshold (e.g., to the binary value 10). If the bimodal count meets or exceeds the threshold, this condition indicates that the number of victims at the L2 cache 105 has been below the L2 victim count threshold 232 for a specified number of successive low-power mode periods, thus indicating that the workload 109 is not using the full capacity of the L3 cache 110. Accordingly, in response to the bi-modal count meeting or exceeding the threshold, the array size control module 220 selects the larger of the size 234 and size 235. Otherwise, the array size control module 220 selects the smaller of the size 234 and size 235. The array size control module then sets the size 118 to the selected size.

Figure 3:
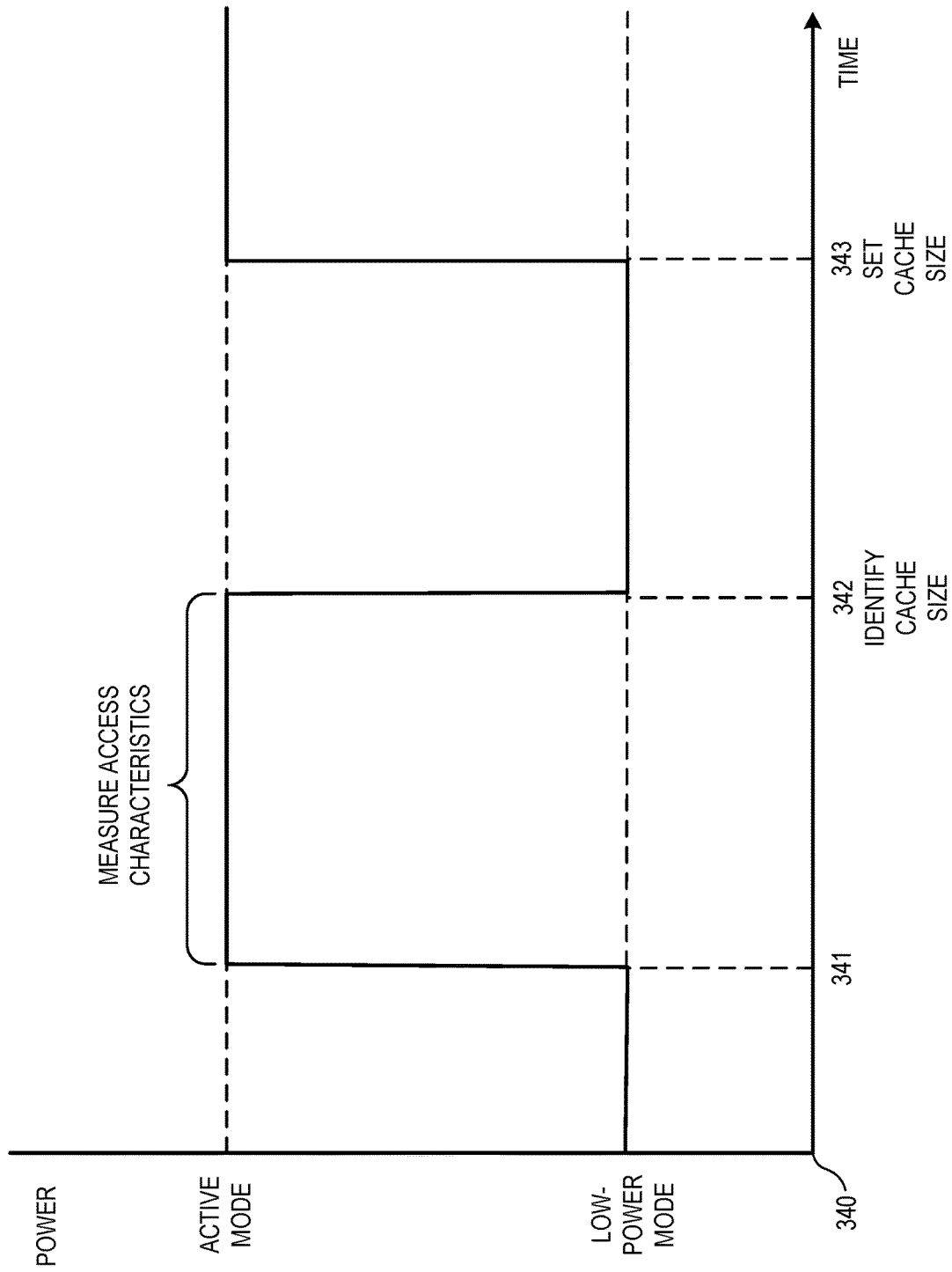
FIG. 3 is a diagram illustrating an example of the timing of the processor of FIG. 1 identifying characteristics of the workload in accordance with some embodiments.

FIG. 3 depicts a diagram 340 illustrating operations associated with different power modes at the processor 100 in accordance with some embodiments. In particular, the diagram 340 is a chart having an X-axis representing time and a Y-axis representing the power mode of the processor 100. In the example of FIG. 3, the Y-axis represents the active mode and the low-power mode of the processor 100.

As illustrated, prior to a time 341, the processor 100 is in the low-power mode. At time 341, the processor 100 transitions to the active mode. In response, the cache controller 115 resets any counters associated with identifying the access characteristics 107 of the L2 cache 105, such as any counters measuring a number of cache victims at the L2 cache 105. The processor 100 is in the active mode between the time 341 and a time 342. During the time that the processor 100 is in the active mode (that is, between time 341 and time 342), the cache controller 115 measures the access characteristics 107 for the L2 cache 105. For example, between time 341 and time 342, each time the L2 cache 105 evicts a cache line, the cache controller 115 increments a counter. Thus, at time 342, the counter stores a value indicating the number of cache victims at the L2 cache since time 341, while the processor 100 is in the active mode.

At or near time 342, the power control module 112 indicates that the processor 100 is to enter the low-power mode. In response, the cache controller 115 determines the size 108 for the L3 cache 110 based on the access characteristics 107 measured between time 341 and 342. For example, in some embodiments the cache controller 115 compares the access characteristics 107 (e.g., the cache victim count) to one or more thresholds, and selects one of the pre-defined sizes 234 and 235 based on the one or more comparisons.

The processor 100 is in the low-power mode between the time 342 and a time 343. At or near the time 343, the power control module 112 indicates that the processor 100 is to exit the low-power mode. As part of the low-power mode exit process, the cache controller 115 sets the size 108 of the L3 cache 110 to the size identified at or near the time 342. The L3 cache 110 remains at the size 108 for the next active mode period, beginning at or near time 343. Thus, in the example of FIG. 1, the processor 100 sets the size of the L3 cache 110 for each active period (the periods when the processor 100 is in the active mode) based on access characteristics measured during the previous active period. Because the workload executed during an active period is likely to be substantially the same as or similar to the workload executed during the previous active period, the processor 100 is thus able to tailor the size of the L3 cache 110 to the expected workload to be executed, thereby conserving processor resources while maintaining processor performance.

Figure 4:
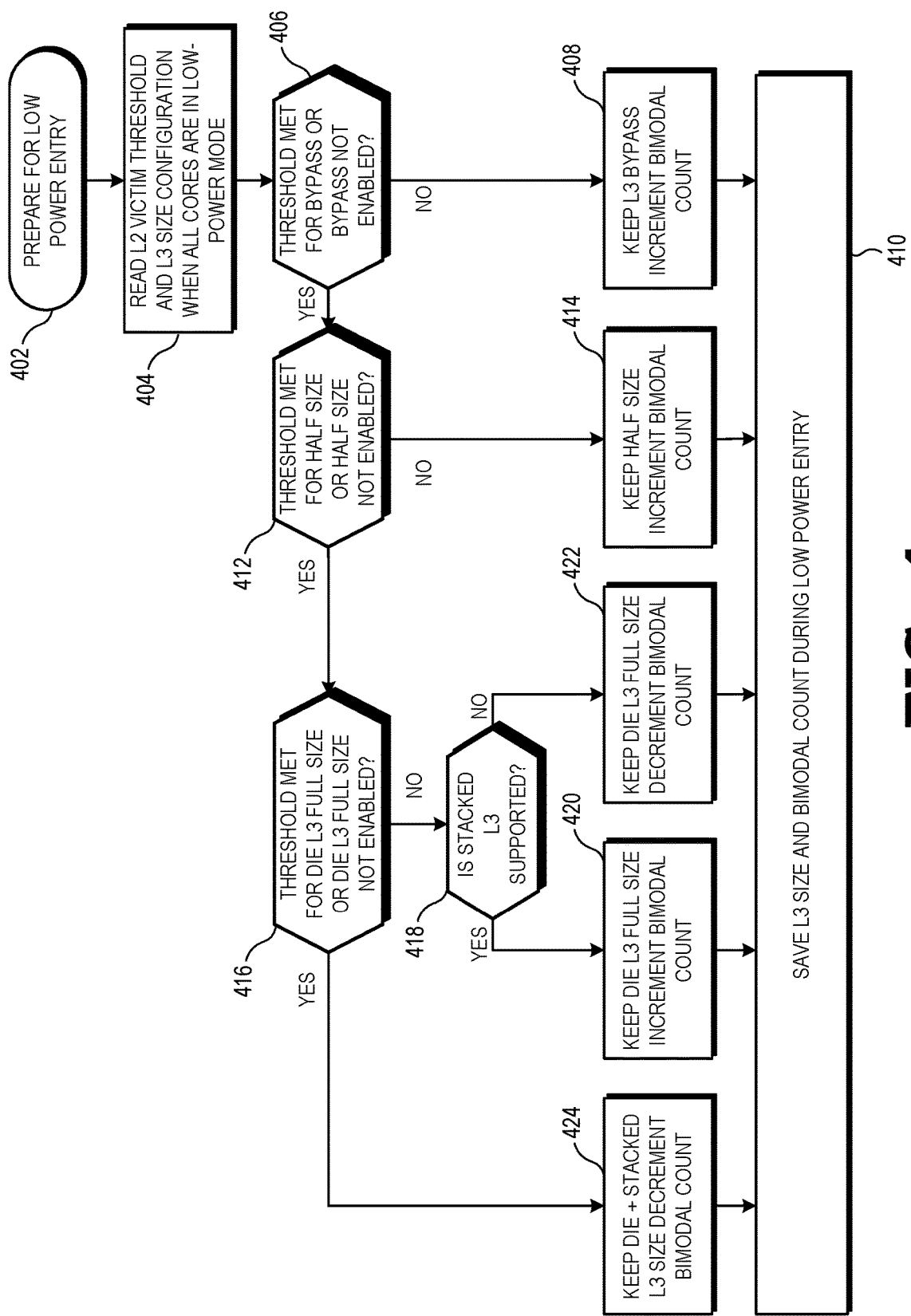
FIG. 4 is a flow diagram of a method of setting a size of a cache based on identifying a workload at a processor in accordance with some embodiments.

FIG. 4 is a flow diagram of a method of identifying a size of a cache based on performance characteristics of a different cache in accordance with some embodiments. For purposes of description, the method of FIG. 4 is described with respect to an example implementation at the processor 100. However, it will be appreciated that in other embodiments the method is implemented at a processor having a different configuration. In addition, the method of FIG. 4 is described under the assumption that the cache controller 115 selects one of three sizes for the L3 cache 110: 1) a bypass size, wherein the L3 cache 110 is bypassed; 2) a half size, wherein the number of ways of the L3 cache 110 are set so that only half of the capacity of storage array 116 is used; and a full size, wherein the number of ways of the L3 cache 110 are set so all of the storage capacity of the storage array 116 is used. However, it will be appreciated that in other embodiments more, fewer, or different cache sizes are used, or any combination thereof.

At block 402, the power control module 112 indicates that the processor 100 is preparing to enter the low-power mode. In response, at block 404 the cache controller 115 reads the L2 victim count thresholds 232 at the threshold register 224 and reads the available sizes (e.g., the sizes 234 and 235) from the size registers 225. At block 406, the cache controller 115 compares the L2 victim count for the L2 cache 105 to the threshold associated with bypass of the L3 cache 110. If the threshold is not met and bypass is enabled, the method flow moves to block 408 and the cache controller 115 sets the size 108 of the L3 cache 110 at the bypass size and increments the bi-modal counter 222. The method flow proceeds to block 410 and the cache controller 115 saves the size 108 and the bi-modal count (the value stored at the bi-modal counter 222) during the entry to the low-power mode.

Returning to block 406, if the bypass threshold has been met, or if bypass of the L3 cache 110 is not enabled, the method flow moves to block 412 and the cache controller 115 compares the L2 victim count for the L2 cache 105 to the threshold associated with half size of the L3 cache 110. If the threshold is not met and half size is enabled, the method flow moves to block 414 and the cache controller 115 sets the size 108 of the L3 cache 110 at the half size and increments the bi-modal counter 222. The method flow proceeds to block 410 described above.

Returning to block 412, if the half size threshold has been met, or if half size of the L3 cache 110 is not enabled, the method flow moves to block 416 and the cache controller 115 compares the L2 victim count for the L2 cache 105 to the threshold associated with full size of the L3 cache 110. If the threshold is not met and full size is enabled, the method flow moves to block 418 and the cache controller 115 determines if a stacked L3 cache is supported. If so, the method flow moves to block 420 and the cache controller 115 sets the size 108 of the L3 cache 110 at the full size and increments the bi-modal counter 222. The method flow proceeds to block 410. If, at block 418, the cache controller 115 determines that a stacked L3 cache is not supported, the method flow moves to block 422 and the cache controller 115 sets the size 108 of the L3 cache 110 at the full size and decrements the bi-modal counter 222. The method flow proceeds to block 410. Returning to block 416, if the full size threshold has been met, or if the full size of the L3 cache 110 is not enabled, the method flow moves to block 424 and the cache controller 115 maintains the L3 cache 110 at its current size and decrements the bi-modal counter 222. The method flow proceeds to block 410 described above.

Figure 5:
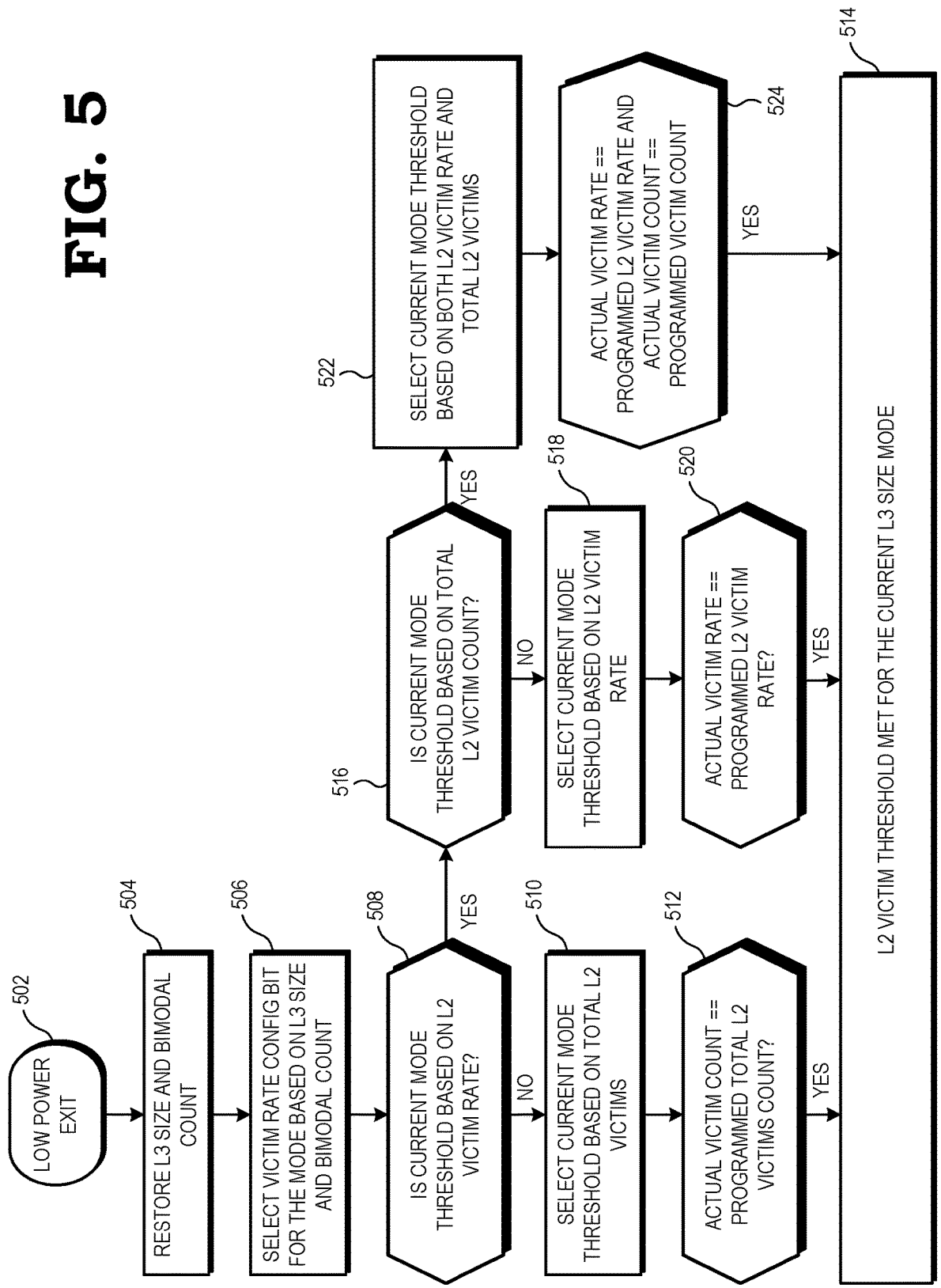
FIG. 5 is a flow diagram of a method of determining a size of a cache based on identifying a workload at a processor in accordance with some embodiments.

FIG. 5 illustrates a flow diagram of a method of setting the size of a cache based on a combination of a number of active processor cores and access characteristics of another cache in accordance with some embodiments. For purposes of description, the method of FIG. 4 is described with respect to an example implementation at the processor 100. However, it will be appreciated that in other embodiments the method is implemented at a processor having a different configuration.

At block 502, the power control module 112 indicates to the cache controller 115 that the processor 100 is exiting the low-power mode and is entering the active mode. In response, at block 504, the cache controller 115 restores the size 118 and bimodal count values that were stored during entry to the low-power mode. At block 506, the cache controller 115 reads a set of configuration bits to determine whether the size 108 of the L3 cache 110 is to be set based on the number of cache victims at the L2 cache 105, based on the cache victim rate at the L2 cache 105, or based on a combination of both the number of cache victims and the cache victim rate.

At block 508, the cache controller 115 determines if the configuration bits indicate that the size 108 is to be set based on the cache victim rate. If not, the method flow moves to block 510 and the cache controller 115 sets the determination of the size 108 to be based on the total number of cache victims at the L2 cache 105. At block 512, the cache controller 115 determines if the number of cache victims at the L2 cache 105 matches or exceeds the programmed threshold for L2 cache victims. If so, the method flow moves to block 514 and the cache controller 115 determines that the L2 victim threshold has been met of the current L3 size mode. If not, the cache controller 115 determines that the L2 victim threshold has not been met of the current L3 size mode.

Returning to block 508, if the cache controller 115 determines that the configuration bits indication that that the size 108 is to be set based on the cache victim rate, the method flow moves to block 516. At block 516, the cache controller 115 determines if the configuration bits indicate that the size 108 is to be set also based on the total number of cache victims at the L2 cache 105. If not, the method flow moves to block 518 and the cache controller 115 sets the determination of the size 108 to be based on cache victim rate at the L2 cache 105. At block 520, the cache controller 115 determines if the cache victim rate matches or exceeds the programmed threshold for L2 cache victim rate. If so, the method flow moves to block 514 and the cache controller 115 determines that the L2 victim threshold has been met of the current L3 size mode. If not, the cache controller 115 determines that the L2 victim threshold has not been met of the current L3 size mode.

Returning to block 516, if the cache controller 115 determines that the configuration bits indication that that the size 108 is to be set based on the total number of cache victims, the method flow moves to block 522 and the cache controller 115 sets the determination of the size 108 to be based on both the total number of cache victims and on the cache victim rate at the L2 cache 105. At block 524, the cache controller 115 determines if the cache victim rate matches or exceeds the programmed threshold for the L2 cache victim rate and if the total number of cache victims at the L2 cache 105. If both conditions are met, the method flow moves to block 514 and the cache controller 115 determines that the L2 victim threshold has been met of the current L3 size mode. If not, the cache controller 115 determines that the L2 victim threshold has not been met of the current L3 size mode.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   incrementing, by a cache controller, a counter in response to a cache line being evicted from one or more caches at a first level of a cache hierarchy of a processor while at least a portion of the processor is in a first power state, wherein the counter indicates one or more access characteristics of the one or more caches at the first level of the cache hierarchy, wherein the one or more access characteristics are associated with a workload executing at the processor, and wherein the cache controller is configured to store a threshold associated with the one or more access characteristics of the one or more caches at the first level of the cache hierarchy; and
   in response to the at least a portion of the processor exiting a second power state, power gating, by the cache controller, one or more unused cache lines of a cache at a second level of the cache hierarchy of the processor based on a relationship between the one or more access characteristics indicated by the counter and the threshold, wherein the cache at the second level of the cache hierarchy is larger than the one or more caches of the first level within the cache hierarchy, and wherein the first power state is a higher-power state than the second power state.

2. The method of claim 1, wherein the one or more access characteristics comprise a number of cache victims at the one or more caches at the first level of the cache hierarchy.

3. The method of claim 2, wherein the number of cache victims indicates a number of cache victims since a previous exit from the second power state by the at least a portion of the processor.

4. The method of claim 1, wherein the one or more access characteristics comprise a cache victim rate at the one or more caches at the first level of the cache hierarchy.

5. The method of claim 1, wherein the one or more unused cache lines is set:
   in response to a request to enter the second power state at the processor.

6. The method of claim 1,
   wherein the cache hierarchy is incorporated into a stacked die integrated circuit.

7. The method of claim 6,
   wherein the one or more unused cache lines are located on different dies of the stacked die integrated circuit.

8. A method, comprising:
   incrementing, by a cache controller, a first counter in response to a cache line being evicted from first cache at a first level of a cache hierarchy of a processor while at least a portion of the processor is in a first power state, wherein the first counter indicates one or more access characteristics of the first cache at the first level of the cache hierarchy, wherein the one or more access characteristics are associated with a workload executing on the processor, and wherein the cache controller is configured to store a threshold associated with the one or more access characteristics of the first cache at the first level of the cache hierarchy;
   incrementing, by the cache controller, a second counter based on a relationship between the one or more access characteristics indicated by the first counter to the threshold; and
   in response to exiting a second power state of the processor, power gating, by the cache controller, one or more unused caches lines of a second cache at a second level of the cache hierarchy of the processor based on a value of the second counter, wherein the second cache at the second level of the cache hierarchy is larger than the first cache at the first level of the cache hierarchy, and wherein the first power state is a higher-power state than the second power state.

9. The method of claim 8, wherein power gating the one or more unused cache lines of the second cache at the second level of the cache hierarchy is further based on a number of active processor cores at the processor.

10. The method of claim 8, wherein the one or more access characteristics comprise a number of cache victims at the first cache of the first level of the cache hierarchy.

11. The method of claim 8, wherein the one or more access characteristics comprise a cache victim rate at the first cache of the first level of the cache hierarchy.

12. The method of claim 8, wherein the one or more unused cache lines is set:
   in response to a request to enter the second power state at the processor.

13. The method of claim 8, wherein the second counter comprises a bi-model counter.

14. A processor comprising:
   a first cache at a first level of a cache hierarchy;
   a second cache at a second level of the cache hierarchy, wherein the second cache at the second level of the cache hierarchy is smaller than the first cache at the first level of the cache hierarchy; and
   a cache controller configured to:
      increment a counter in response to a cache line being evicted from the first cache at the first level of the cache hierarchy while at least a portion of the processor is in a first power state, wherein the counter indicates one or more monitor access characteristics of the first cache of the first level of the cache hierarchy, and wherein the one or more access characteristics are associated with a workload being executed by the processor;
      store a threshold associated with the one or more access characteristics; and
      in response to the processor exiting a second power state, power gate one or more unused cache lines of the second cache at the second level of the cache hierarchy based on a relationship between the one or more access characteristics indicated by the counter and the threshold, and wherein the first power state is a higher-power state than the second power state.

15. The processor of claim 14, wherein the one or more access characteristics comprise a number of cache victims at the first cache of the first level of the cache hierarchy.

16. The processor of claim 15, wherein the number of cache victims indicates a number of cache victims since a previous exit from the second power state by the at least a portion of the processor.

17. The processor of claim 14, wherein the one or more access characteristics comprise a cache victim rate at the first cache of the first level of the cache hierarchy.

18. The processor of claim 14, wherein the one or more unused cache lines is set in response to a request to enter the second power state at the processor.

19. The processor of claim 14, wherein the cache hierarchy is incorporated into a stacked die integrated circuit.

20. The processor of claim 19, wherein the one or more unused cache lines are located on different dies of the stacked die integrated circuit.

\* \* \* \* \*